United States Patent
Efrati

(10) Patent No.: US 9,369,872 B2
(45) Date of Patent: Jun. 14, 2016

(54) METHOD AND APPARATUS FOR CONFIGURING COMMUNICATION PARAMETERS ON A WIRELESS DEVICE

(71) Applicant: Vonage Business Inc., Atlanta, GA (US)

(72) Inventor: Tzahi Efrati, Hoboken, NJ (US)

(73) Assignee: Vonage Business Inc., Atlanta, GA (US)

( * ) Notice: Subject to any disclaimer, the term of this patent is extended or adjusted under 35 U.S.C. 154(b) by 46 days.

(21) Appl. No.: 14/291,638

(22) Filed: May 30, 2014

(65) Prior Publication Data

US 2014/0282860 A1 Sep. 18, 2014

Related U.S. Application Data

(63) Continuation-in-part of application No. 13/827,365, filed on Mar. 14, 2013, now Pat. No. 8,799,993.

(51) Int. Cl.
*H04W 12/08* (2009.01)
*H04L 29/06* (2006.01)
*H04W 24/02* (2009.01)

(52) U.S. Cl.
CPC ............. *H04W 12/08* (2013.01); *H04L 63/205* (2013.01); *H04W 24/02* (2013.01)

(58) Field of Classification Search
CPC ...... H04W 12/08; H04W 24/02; H04L 63/20; H04L 63/205; H04L 69/24; H04L 29/06
See application file for complete search history.

(56) References Cited

U.S. PATENT DOCUMENTS

| | | | |
|---|---|---|---|
| 7,174,564 B1 | 2/2007 | Weatherspoon et al. | |
| 7,437,772 B1 | 10/2008 | Thenthiruperai et al. | |
| 8,527,626 B1 * | 9/2013 | Wang | G06F 3/061 709/224 |
| 8,646,074 B1 | 2/2014 | Gangadharan | |
| 2004/0152447 A1 | 8/2004 | McDonnell et al. | |
| 2004/0187034 A1 * | 9/2004 | Tamura | H04L 63/1458 726/27 |
| 2004/0236547 A1 | 11/2004 | Rappaport et al. | |
| 2005/0055578 A1 * | 3/2005 | Wright | G06F 21/32 726/4 |
| 2005/0076243 A1 * | 4/2005 | Morohashi | H04L 63/0227 726/4 |
| 2006/0075466 A1 * | 4/2006 | Ramanathan | H04L 41/0893 726/1 |
| 2006/0143693 A1 | 6/2006 | Glickman | |
| 2006/0153153 A1 | 7/2006 | Bhagwat et al. | |
| 2006/0212925 A1 | 9/2006 | Shull et al. | |
| 2006/0230278 A1 | 10/2006 | Morris | |
| 2006/0274643 A1 | 12/2006 | Choyi et al. | |
| 2007/0049323 A1 | 3/2007 | Wang et al. | |
| 2007/0053508 A1 | 3/2007 | Yasumoto | |

(Continued)

OTHER PUBLICATIONS

DSLreports, https://web.archive.org/web/20111117141416/http://www.dslreports.com/zagat as archived by www.archive.org on Nov. 17, 2011.

*Primary Examiner* — Darren B Schwartz
(74) *Attorney, Agent, or Firm* — Moser Taboada; Joseph Pagnotta

(57) ABSTRACT

A method and apparatus for configuring communication parameters of a first wireless device having an established communication connection includes communicating with a wireless access point using communication parameters based on a selected first security policy; receiving information from the wireless access point regarding one or more second wireless devices connected to the wireless access point; selecting a second security policy to apply to the first wireless device based on the information received from the wireless access point; adjusting the one or more communication parameters of the first wireless device based on the second security policy; and communicating with the wireless access point using the adjusted communication parameters.

13 Claims, 5 Drawing Sheets

(56) References Cited

U.S. PATENT DOCUMENTS

| | | | |
|---|---|---|---|
| 2007/0124797 A1* | 5/2007 | Gupta | H04L 63/102 726/1 |
| 2007/0167173 A1 | 7/2007 | Halcrow et al. | |
| 2007/0204324 A1* | 8/2007 | Roberts | G06F 21/31 726/1 |
| 2007/0217371 A1* | 9/2007 | Sinha | H04L 63/1408 370/338 |
| 2008/0046719 A1* | 2/2008 | Kim | H04W 12/06 713/156 |
| 2008/0070563 A1 | 3/2008 | Adya et al. | |
| 2008/0104242 A1* | 5/2008 | Zavalkovsky | H04L 63/20 709/225 |
| 2008/0250478 A1 | 10/2008 | Miller et al. | |
| 2009/0064299 A1 | 3/2009 | Begorre et al. | |
| 2009/0325566 A1* | 12/2009 | Bell | H04W 8/22 455/419 |
| 2011/0138463 A1* | 6/2011 | Kim | H04L 63/1425 726/22 |
| 2011/0167497 A1 | 7/2011 | Van De Groenendaal et al. | |
| 2011/0208866 A1 | 8/2011 | Marmolejo-Meillon et al. | |
| 2012/0011559 A1* | 1/2012 | Miettinen | G06F 21/31 726/1 |
| 2012/0178488 A1 | 7/2012 | Jonker et al. | |
| 2012/0185910 A1 | 7/2012 | Miettinen et al. | |
| 2012/0204222 A1* | 8/2012 | Bodi | H04L 63/20 726/1 |
| 2012/0222107 A1* | 8/2012 | Sainio | G06F 21/554 726/12 |
| 2012/0246468 A1 | 9/2012 | Gabor | |
| 2012/0284771 A1 | 11/2012 | Baron et al. | |
| 2012/0322407 A1 | 12/2012 | Haberman | |
| 2013/0012260 A1* | 1/2013 | Salkintzis | H04W 48/08 455/550.1 |
| 2013/0040603 A1 | 2/2013 | Stahlberg et al. | |
| 2013/0095751 A1 | 4/2013 | Kasslin et al. | |
| 2013/0097710 A1 | 4/2013 | Basavapatna et al. | |
| 2013/0155876 A1 | 6/2013 | Potra et al. | |
| 2013/0254831 A1* | 9/2013 | Roach | H04L 63/107 726/1 |
| 2014/0269728 A1* | 9/2014 | Jalan | H04L 45/306 370/392 |
| 2014/0304408 A1* | 10/2014 | Rhee | H04L 1/0019 709/224 |

* cited by examiner

METHOD AND APPARATUS FOR CONFIGURING COMMUNICATION PARAMETERS ON A WIRELESS DEVICE

CROSS-REFERENCE TO RELATED APPLICATIONS

This application is a continuation-in-part of co-pending U.S. non-provisional patent application Ser. No. 13/827,365 filed Mar. 14, 2013, which is herein incorporated by reference in its entirety.

BACKGROUND OF THE INVENTION

1. Field of the Invention

The invention is related to the field of telecommunication devices and services and more specifically, the invention is directed to a method and apparatus for configuring communication parameters on a wireless device.

2. Description of the Related Art

Mobile devices can communicate with other devices using various networking technologies. Some of those technologies include mobile communications standards such as 3G, 4G, WiMAX, and the like. Another such network technology, 802.11, represents a set of wireless networking standards that was promulgated by the Institute of Electrical and Electronics Engineers (IEEE). The 802.11 family (i.e., 802.11 legacy, 802.11g, 802.11n, and the like) includes multiple over-the-air modulation techniques that all use the same basic protocol. The 802.11 family facilitates the transmission and reception of data between two or more computers (e.g., servers, laptops, and the like), networking devices (e.g., adapters, gateways, routers, access points, and the like) and/or mobile devices (e.g., Bluetooth devices, Personal Desktop Assistants, mobile phones, and the like). Wi-Fi is used to describe a networking interface of computing devices that are coupled to a wireless local area network built on 802.11.

To access a wireless local area network, a device may scan for and communicate with a wireless access point (e.g., a hotspot) supplied and maintained by a local Wi-Fi provider to access higher tiers of the network (e.g., a gateway, a backhaul device, a backbone network, and the like). However, the security or trustworthiness of said Wi-Fi provider may be suspect. Thus, a user of a mobile device may not be comfortable transferring certain types of information, or accessing certain types of application (such as banking applications), over these unsecure/untrusted network access points.

Thus, there is a need for a method and apparatus for determining a security level of an access point and configuring communication parameters on a wireless device to better control how data is transferred over secure and unsecure network access points.

SUMMARY OF THE INVENTION

A method for configuring communication parameters of a first wireless device having an established communication connection is provided herein. In some embodiments, the method may include communicating with a wireless access point using communication parameters based on a selected first security policy; receiving information from the wireless access point regarding one or more second wireless devices connected to the wireless access point; selecting a second security policy to apply to the first wireless device based on the information received from the wireless access point; adjusting the one or more communication parameters of the first wireless device based on the second security policy; and communicating with the wireless access point using the adjusted communication parameters.

In some embodiments, the method for configuring communication parameters of a first wireless device having an established communication may include communicating with a wireless access point; determining one or more second wireless devices connected to the wireless access point; selecting a security policy to apply to the first wireless device based on the security policy of the one or more second wireless devices connected to the wireless access point; adjusting one or more communication parameters of the first wireless device based on the security policy; and communicating with the wireless access point using the adjusted communication parameters.

In some embodiments, an apparatus for configuring communication parameters of a wireless device includes at least one processor, at least one input device, and at least one storage device storing processor executable instructions which, when executed by the at least one processor, performs a method including communicating with a wireless access point using communication parameters based on a selected first security policy; receiving information from the wireless access point regarding one or more second wireless devices connected to the wireless access point; selecting a second security policy to apply to the first wireless device based on the information received from the wireless access point; adjusting the one or more communication parameters of the first wireless device based on the second security policy; and communicating with the wireless access point using the adjusted communication parameters.

In some embodiments, an non-transient computer readable medium for storing computer instructions that, when executed by at least one processor causes the at least one processor to perform a method for configuring communication parameters of a wireless device including communicating with a wireless access point using communication parameters based on a selected first security policy; receiving information from the wireless access point regarding one or more second wireless devices connected to the wireless access point; selecting a second security policy to apply to the first wireless device based on the information received from the wireless access point; adjusting the one or more communication parameters of the first wireless device based on the second security policy; and communicating with the wireless access point using the adjusted communication parameters.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
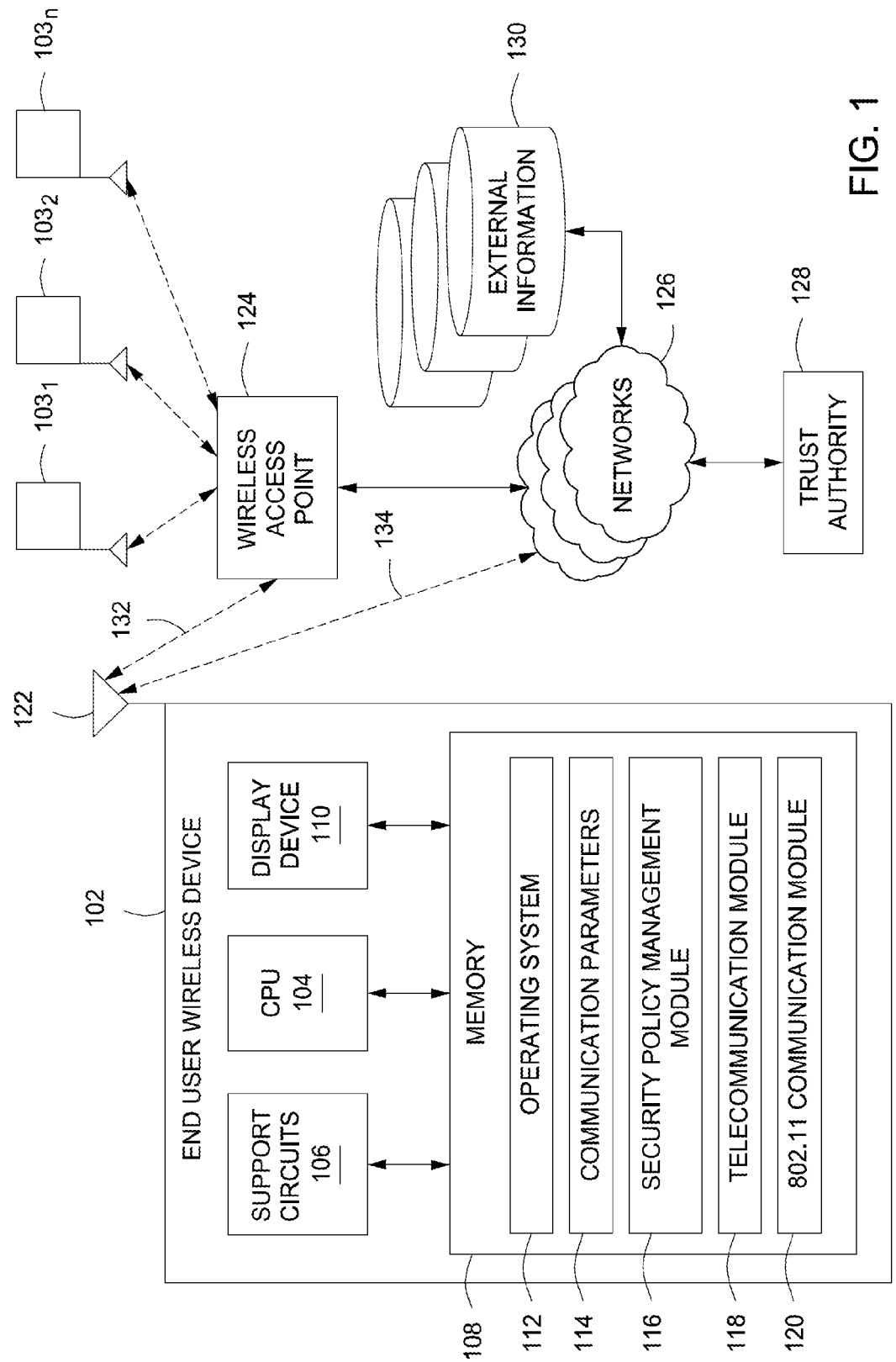
FIG. 1 depicts a block diagram of a system for configuring communication parameters on a wireless device, in accordance with embodiments consistent with the present application.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention include a method and apparatus for configuring communication parameters on a wireless device. Exemplary embodiments described herein determine a security level of an access point and may configure communication parameters on a wireless device based on the determined security level to better control how data is transferred over secure and unsecure network access points.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a system 100 for configuring communication parameters on a wireless device, according to one or more embodiments. The system 100 includes an end user wireless device 102 that is connected to a wireless access point 124 and a plurality of connected end user wireless devices $103_1$, $103_2$, . . . , $103_n$ (collectively referred to as connected end user device 103) that are connected to the wireless access point 124. The end user device 102 and the connected end user devices 103 comprise a Central Processing Unit (CPU) 104, support circuits 106, memory 108, and the display device 110. The CPU 104 may comprise one or more commercially available microprocessors or microcontrollers that facilitate data processing and storage. The various support circuits 106 facilitate the operation of the CPU 104 and include one or more clock circuits, power supplies, cache, input/output circuits, and the like. The memory 106 comprises at least one of Read Only Memory (ROM), Random Access Memory (RAM), disk drive storage, optical storage, removable storage and/or the like. In some embodiments, the memory 108 comprises an operating system 112, communication parameters 114, security policy management module 116, standard mobile telecommunication module 118, and an 802.11 communication module. In addition, end user device 102 may include antennae 122 for wireless communication with various other wireless devices and networks.

The operating system (OS) 112 generally manages various computer resources (e.g., network resources, file processors, and/or the like). The operating system 112 is configured to execute operations on one or more hardware and/or software modules, such as Network Interface Cards (NICs), hard disks, virtualization layers, firewalls and/or the like. Examples of the operating system 112 may include, but are not limited to, Linux, Mac OSX, BSD, Unix, Microsoft Windows, iOS, Android and the like.

The networks 126 comprise one or more communication systems that connect computers by wire, cable, fiber optic and/or wireless link facilitated by various types of well-known network elements, such as hubs, switches, routers, and the like. The networks 126 may include an Internet Protocol (IP) network, a public switched telephone network (PSTN), or other mobile communication networks, and may employ various well-known protocols to communicate information amongst the network resources.

The system 100 further includes one or more wireless access points 124 that may be used to connect wireless device 102 to networks 126 using 802.11 communication module 120. In some embodiments, wireless device 102 may connect to networks 126 using telecommunication module 118. A trust authority 128 and external information repositories 130 may also be included in system 100 and used to help end user wireless 102 determine a security level of wireless access points 124 as discussed below with respect to FIG. 2.

Figure 2:
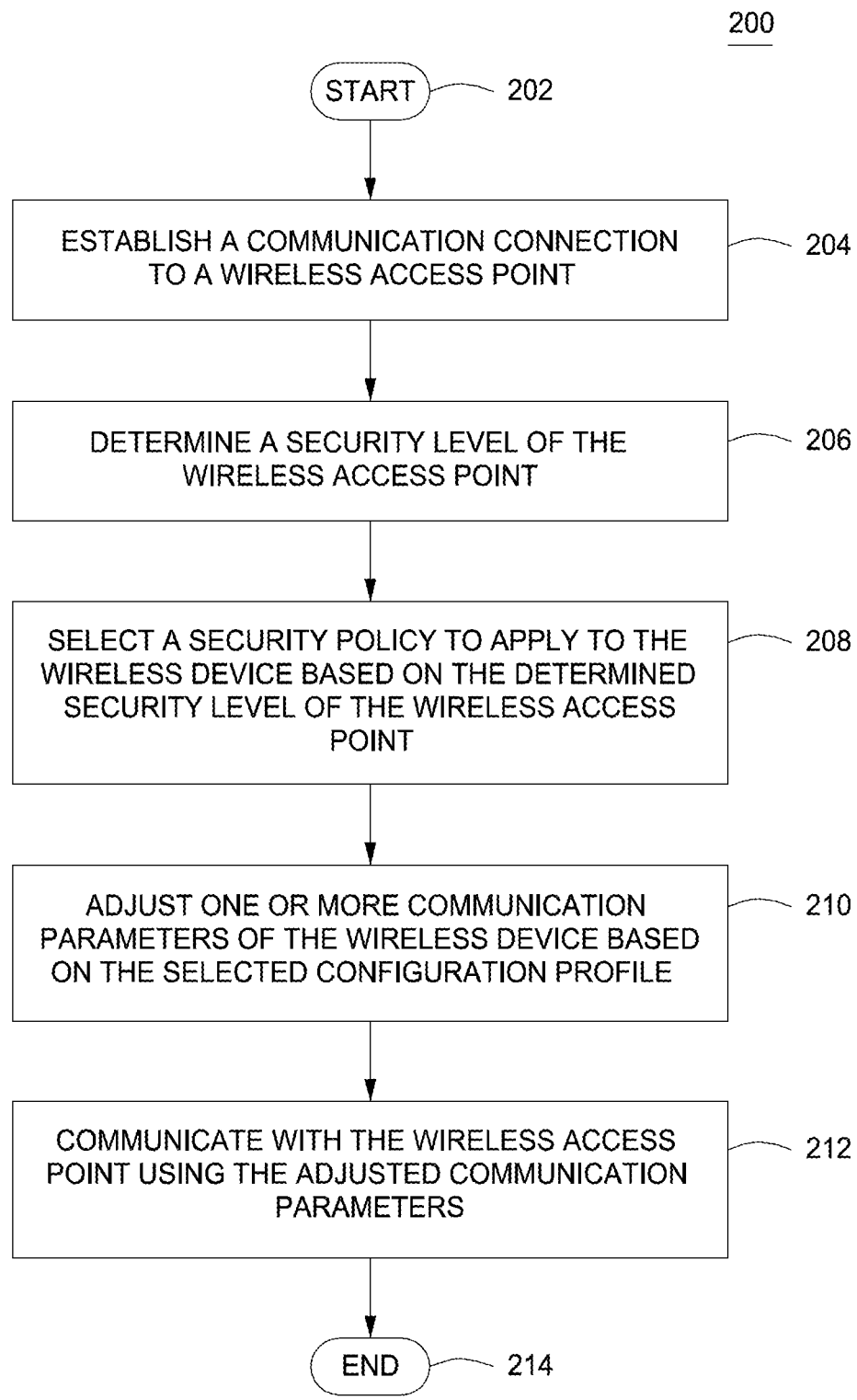
FIG. 2 depicts a flow diagram of a method for configuring communication parameters on a wireless device, according to one or more embodiments of the invention.

A method 200 in accordance with the subject invention is illustrated in FIG. 2 which depicts a flowchart having a series of steps for configuring communication parameters of a wireless device. In detail, the method 200 starts at 202 and proceeds to 204 where a communication connection is established between a wireless device and a wireless access point. That is, the wireless device 102 intercepts one or more wireless signals 132 broadcast from a wireless access point 124 representing wireless network availability. In some embodiments of the invention, such communication connection may be a standard 3G/4G mobile communication connection established using telecommunication module 118. In some embodiments, the communication connection may be a Wi-Fi connection established using 802.11 communication module 120. Those skilled in the art of wireless communications know that other types of communication connections/environments exist and can be readily accessed with the appropriate types of hardware and signaling protocols and are considered within the scope of the invention. For example Bluetooth, WiMax and other, less known networks may be used. In addition, although described in terms of wireless communications, the inventive features of embodiments described herein can also apply to devices connecting to a LAN using wired technology.

At 206, one or more security characteristics of the wireless access point are determined. In some embodiments the security characteristics are determined by the wireless device 102. In some embodiments, analysis of the wireless signal(s) by the security policy management module provides identification of the security characteristics of the wireless access point with which the wireless device is communicating. In other embodiments, the wireless access point may provide a standardized set of security characteristics verified by a trust authority 128. The security characteristics determined may indicate that a security level of the wireless access point is secure, unsecure, unsafe, suspicious, etc. In some embodiments, information from other external sources 130 about the wireless access point may be used to determine the one or more security characteristics. The information used to determine the one or more security characteristics may include a history of positive or negative comments about the access point. In some embodiments, the information about the wireless access point may be obtained via a second network communication connection 134 (e.g., via standard 3G/4G mobile device communications) from a trusted authority 128. For example, in some embodiments, the wireless device may obtain security information of the wireless access point via an SMS message or the like. In some embodiments, the wireless device may receive a list of hot spots, associated security levels, and/or connection recommendations for a geographical area when the user enters that area. In other embodiments, the wireless device may connect through the access point to a trusted site and run a security test to see, for example, if packets are dropped or changed. The result of said test may be used to determine the one or more security characteristics. In some embodiments, the one or more security characteristics may include: (a) public opinion rating of the specific access point being connected to; (b) ratings from companies or organization of the specific access point being connected to; (c) public opinion rating of the service provider associated with the access point being connected to; (d) ratings from companies or organization about the service provider associated with the access point being connected to; (e) encryption support provided by the access point; (f) security standards implemented by the access point; (g) authorization required by the access point; and the like. In some embodiments, the one or more security characteristics may be used to determine a security level score indicating the trustworthiness of the access point.

The wireless security protocol used can also indicate the level of security. For example, if no security is configured or an easily compromised protocol like WEP is configured, the access point may be considered insecure. If a more secure protocol like WPA2 is used for the wireless connection, the hotspot can be further authenticated by verifying related information like location (e.g., GPS coordinates), public IP subnet, and the like, against a database containing such metadata. Finally if a mechanism like the WiFi Alliance Passport is used for connecting to an access point, the access point may be considered secure.

At 208, a security policy to apply to the wireless device is selected based on the determined security level of the wireless access point. In addition, in some embodiments, the security policy applied may further be based on the device capabilities (e.g., whether the device supports 512 bit encryption, etc.). The security policy may be selected automatically by the security policy management module 116. In some embodiments, the security policy is manually selected by the user based on the determined security level of the wireless access point. The security policy is a collection of one or more communication parameters 114 that define whether or not certain types of data, SMS, or voice communications should be sent, and if so, how the mobile device should transfer those types of data, SMS, or voice communications. In some embodiments, the security policy may define which applications stored on the wireless device may be executed while connected to an unsecure wireless access point. In other embodiments, the security policy may define security measures to be implemented to complete various communication activities (for example, having to encrypt emails, forcing a virtual private network (VPN) be established, sending files up to a specified security classification, and the like.).

Once a security level is determined, or a security policy is selected, the wireless device, or a device management system associated with the wireless device, may decide to share the selected policy with a shared knowledge center for other devices to access and used in accessing security levels of various access points.

In some embodiments, a second communication policy may also be selected based on the service provider of the access point. For example, once it is determined that the wireless access point being connected to is a partner network, a communication policy including configuration parameters that allow the wireless device to authenticate with the partner network may be applied resulting in preferential treatment of the wireless device's data traffic.

At 210, one or more communication parameters 114 of the wireless device are adjusted based on the selected security profile. Specifically, in some embodiments, if the security level of an access point is determined to be unsecure, or has a 'low' security level score, certain communication parameters 114 may be adjusted such that no data is sent via the unsecure wireless access point, or any data that is sent is encrypted. For example, such communications parameters 114 and settings may include approving/rejecting applications from executing; approving/rejecting certain types of content to be sent/received; implementing a certain encryption standard; and the like.

Finally, at 212, once the communication parameters 114 of the wireless device are adjusted based on the selected security profile, the wireless device may communicate with the wireless access point using the adjusted communication parameters. The method 200 ends at 214.

Figure 3:
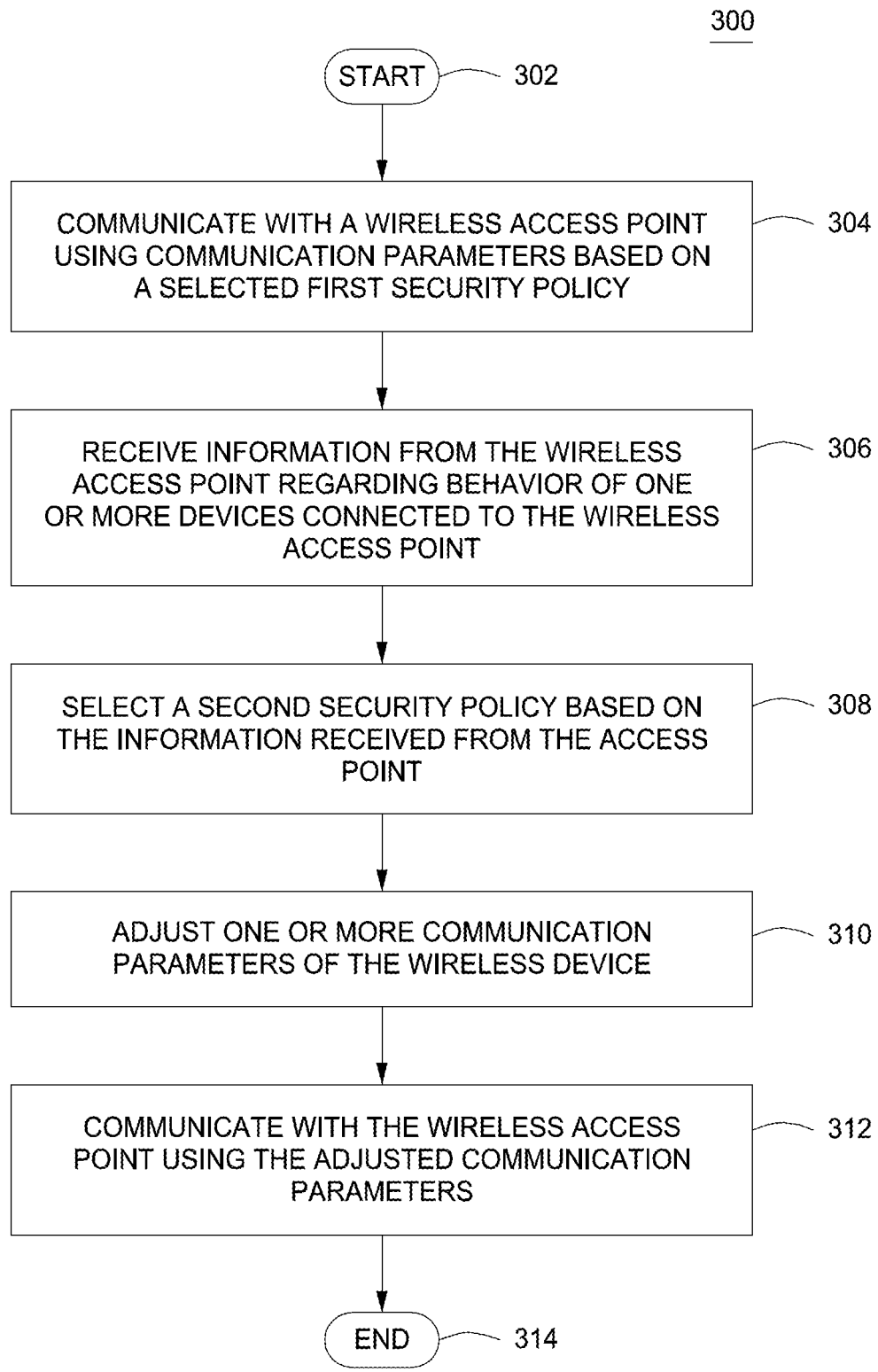
FIG. 3 depicts a flow diagram of a method for adjusting configuration communication parameters on a wireless device, according to one or more embodiments of the invention.

FIG. 3 depicts a flow diagram of a method 300 for adjusting configuration communication parameters on a wireless device, according to one or more embodiments of the invention. The method 300 starts at step 302 and proceeds to step 304.

At step 304, a wireless device communicates with a wireless access point using communication parameters that are based on a selected first security policy, as described in detail with respect to FIG. 2, above.

At step 306, information is received from the wireless access point regarding behavior of one or more connected end user devices 103. The wireless access point may gather the information from the one or more connected devices. In addition, the wireless access point may gather information from other wireless access points that the one or more connected end user devices were previously connected to. The received information may include bandwidth consumption, suspicious web service access, improper proprietary information access, a running of distributed denial-of-service attacks, or any information regarding the behavior by the one or more connected end user devices 103. In some embodiments, the wireless access point determines a security policy for the wireless device based on the gathered information and sends the security policy to the wireless device. In some embodiments, the wireless access point sends the information gathered from the one or more connected end user devices as well as the information gathered from other wireless access points to the wireless device.

At step 308, a second security policy is selected based on the information received from the wireless access point. If a security policy was determined by the wireless access point, the determined security policy is selected as the second security policy for the wireless device. The second security policy replaces the first security policy for the wireless device. In some embodiments, where information regarding the behavior of the one or more connected end user devices is received from the wireless access point, the second security policy is selected similarly to how the first security policy was selected in step 208 above, with the additional consideration of the behavior of the one or more end user devices 103 connected to the access point.

At step 310, the one or more communication parameters 114 of the wireless device are adjusted based on the selected second security profile. As in step 210 above, such communications parameters 114 and settings may include allowing/restricting device from accessing web services; approving/rejecting certain types of content to be sent/received; implementing a certain encryption standard; and the like.

At step 312, the wireless device may communicate with the wireless access point using the adjusted communication parameters based on the second security profile. The method 300 ends at step 314.

Figure 4:
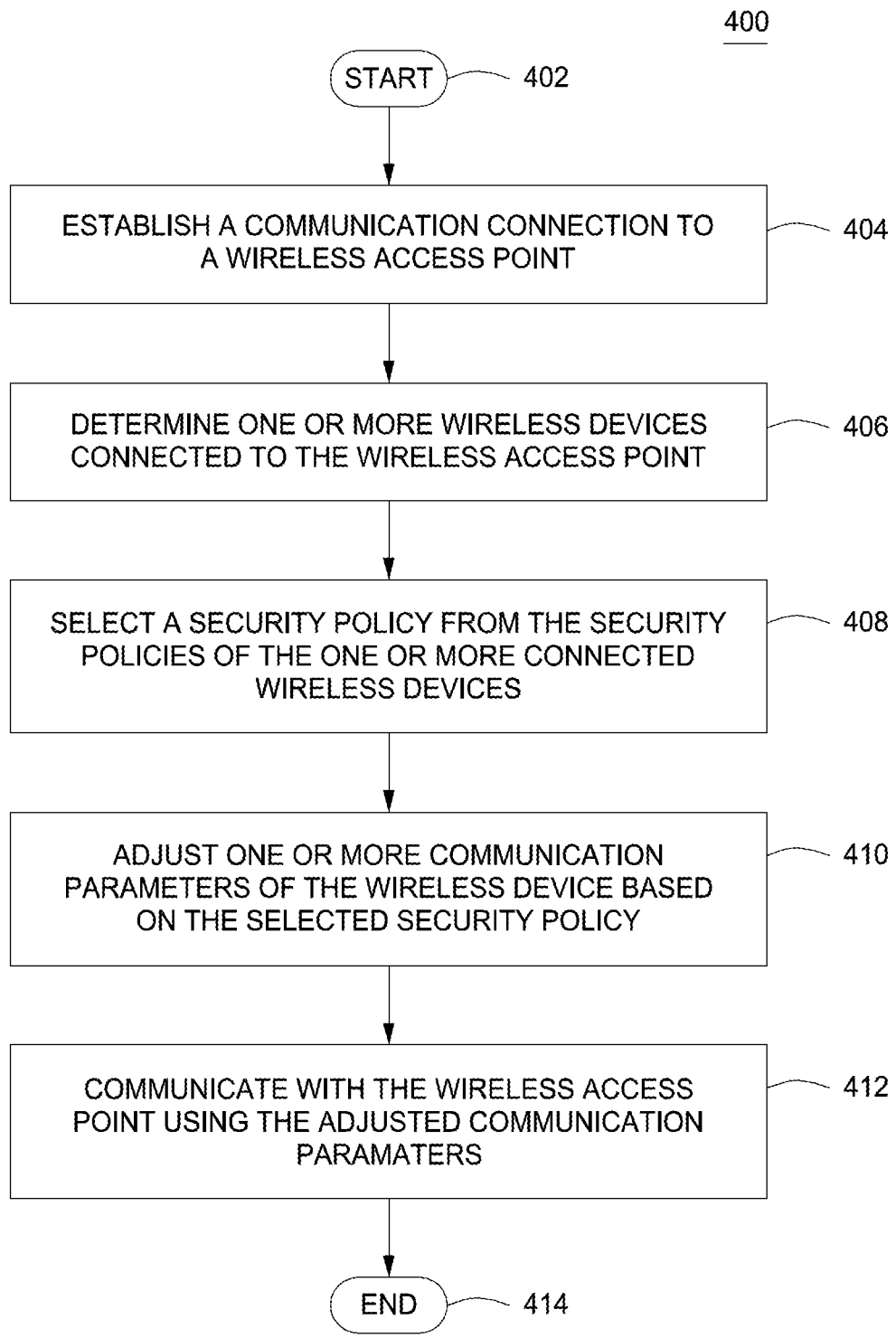
FIG. 4 depicts a flow diagram of a method for configuring communication parameters on a wireless device based on wireless devices connected to a wireless access point, according to one or more embodiments on the invention.

FIG. 4 depicts a flow diagram of a method 400 for configuring communication parameters on a first wireless device based on one or more second wireless devices connected to a wireless access point, according to one or more embodiments on the invention. The method 400 starts at step 402 and proceeds to step 404.

At step 404, a communication connection is established between a first wireless device and a wireless access point. That is, the wireless device 102 intercepts one or more wireless signals 132 broadcast from a wireless access point 124 representing wireless network availability. In some embodiments of the invention, such communication connection may be a standard 3G/4G mobile communication connection established using telecommunication module 118. In some embodiments, the communication connection may be a Wi-Fi connection established using 802.11 communication module 120. Those skilled in the art of wireless communications know that other types of communication connections/environments exist and can be readily accessed with the appropriate types of hardware and signaling protocols and are considered within the scope of the invention. For example Bluetooth, WiMax and other, less known networks may be used. In addition, although described in terms of wireless communications, the inventive features of embodiments described herein can also apply to devices connecting to a LAN using wired technology.

At step 406, the first wireless device determines one or more second wireless devices that are connected to the wireless access point. Specifically, the wireless device 102 sends a request to the wireless access point 124 for the wireless devices 103 connected to the wireless access point. The wireless access point maintains information regarding each wireless device that is connected to the access point. The information may include a security policy of the wireless device, behavior of the wireless device, such as bandwidth consumption, web services used by the wireless device, and other activities such as running distributed denial-of-service attacks (DDOS) attacks, and the like. Information regarding each of the one or more wireless devices is received from the wireless access point. Although the wireless access point may maintain an identifier of a wireless device that is associated with the security policy and behavior of the wireless device, the information sent from the wireless access point need only include the security policy and behavior of a given wireless device.

At step 406, a security policy is selected from the security policies of the one or more connected wireless devices 103. In some embodiments, a security policy used by a majority of the one or more connected wireless devices is selected as the security policy for the first wireless device. In some embodiments, the security policy is selected from a most-trusted of the one or more connected wireless devices. The connected wireless device that is determined to be most-trusted is the connected wireless device that has engaged in the least amount of suspicious behavior. For example the least amount of suspicious behavior may be low bandwidth consumption, no suspicious web service access, no running of DDOS attacks, and the like. In such embodiments, the security policy of the determined most trusted connected wireless device is selected as the security policy for the first wireless device.

In some embodiments, the security policy of connected wireless device that has similar characteristics to the first wireless device is selected as security policy for the first wireless device. A connected wireless device is determined to have similar characteristics to the first wireless device when connected wireless device has a most similar data consumption history to the first wireless device. For example, the browser histories of the one or more connected wireless devices may be compared to the browser history of the first wireless device. The connected wireless device with the most similarities is determined to have the most similar characteristics to the wireless device. In some embodiments, wireless devices are placed into categories based on their data consumption history. In such embodiment, a connected wireless device that falls into a same category as the first wireless device is determined to be most similar to the first wireless device.

At step 410, one or more communication parameters 114 of the first wireless device are adjusted based on the selected security profile. For example, such communications parameters 114 and settings may include approving/rejecting applications from executing; approving/rejecting certain types of content to be sent/received; implementing a certain encryption standard; and the like.

At step 412, once the communication parameters 114 of the wireless device are adjusted based on the selected security profile, the wireless device may communicate with the wireless access point using the adjusted communication parameters. The method 400 ends at 414

The embodiments of the present invention may be embodied as methods, apparatus, electronic devices, and/or computer program products. Accordingly, the embodiments of the present invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 5:
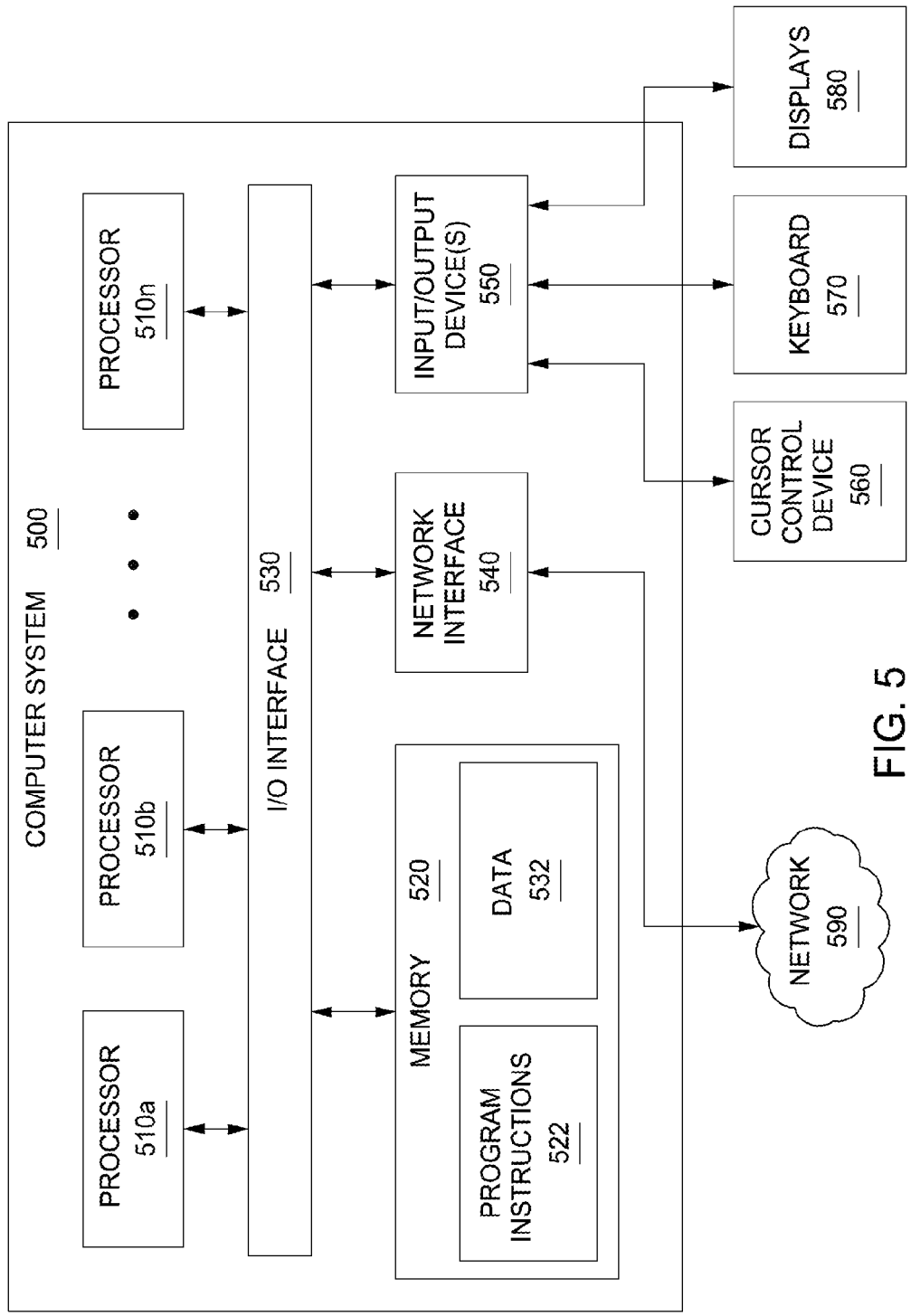
FIG. 5 is a detailed block diagram of a computer system, according to one or more embodiments.

FIG. 5 depicts a computer system 500 that can be utilized in various embodiments of the present invention to implement the computer and/or the display, according to one or more embodiments.

Various embodiments of method and apparatus for transitioning between a plurality of pages on a display device, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement methods 200, 300, and 400 as processor-executable executable program instructions 522 (e.g., program instructions executable by processor(s) 510) in various embodiments.

In the illustrated embodiment, computer system 500 includes one or more processors 510a-510n coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIG. 2, FIG. 3, and FIG. 4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method for configuring communication parameters of a first wireless device having an established communication connection comprising:
   communicating with a wireless access point using one or more communication parameters based on a selected first security policy;
   receiving information from the wireless access point regarding one or more second wireless devices connected to the wireless access point, wherein information received from the wireless access point comprises at least one of suspicious web service access or running distributed denial-of-service attacks by the one or more second wireless devices connected to the access point;
   selecting a second security policy to apply to the first wireless device based on the information received from the wireless access point;
   adjusting the one or more communication parameters of the first wireless device based on the second security policy; and
   communicating with the wireless access point using the adjusted one or more communication parameters.

2. The method of claim 1, wherein each of the first security policy and the second security policy includes a set of one or more communication parameters and associated values that define if and how data should be sent via the wireless access point.

3. The method of claim 1, wherein the first security policy and the second security policy define which applications stored on the first wireless device may be executed while connected to the wireless access point.

4. The method of claim 1, further comprising adjusting the one or more communication parameters to encrypt data communications.

5. The method of claim 1, wherein information received from the one or more second wireless devices comprises the second security policy.

6. A method for configuring communication parameters of a first wireless device having an established communication comprising:
   communicating with a wireless access point;
   determining one or more second wireless devices connected to the wireless access point;
   selecting a security policy to apply to the first wireless device based on a security policy of the one or more second wireless devices connected to the wireless access point, wherein when the security policy of one of the one or more second wireless devices allows the one or more second wireless devices to engage in at least one of suspicious web service access or running distributed denial-of-service attacks, the selected security policy includes one or more communication parameters to adjust on the first wireless device;
   adjusting one or more communication parameters of the first wireless device based on the security policy, wherein the one or more communication parameters of the first wireless device are adjusted to at least one of (i) not allow data to be sent by the first wireless device or (ii) encrypt data sent from the first wireless device; and
   communicating with the wireless access point using the adjusted one or more communication parameters.

7. The method of claim 6, wherein selecting the security policy comprises at least one of (i) selecting a most frequently used security policy across the one or more second wireless devices, (ii) selecting the security policy used by a most-trusted of the one or more second wireless devices, or (iii) selecting the security policy used by one of the one or more second wireless devices most similar to the first wireless device.

8. The method of claim 7, wherein the most-trusted of the one or more second wireless device is the wireless device of the one or more second wireless devices not engaging in suspicious activities.

9. The method of claim 7, wherein the most similar of the one or more second wireless device is the wireless device of the one or more second wireless devices comprising a most similar data consumption history to the first wireless device over a predetermined period of time.

10. The method of claim 6, wherein the security policy includes a set of one or more communication parameters and associated values that define if and how data should be sent via the wireless access point.

11. The method of claim 6, wherein the security policy defines which applications stored on the wireless device may be executed while connected to a wireless access point.

12. An apparatus for configuring communication parameters of a first wireless device comprising:
   a) at least one processor;
   b) at least one input device; and
   c) at least one storage device storing processor-executable instructions which, when executed by the at least one processor, performs a method including
      1) establishing a communication connection with a wireless access point using one or more communication parameters based on a selected first security policy;
      2) receiving information from the wireless access point regarding one or more second wireless devices connected to the wireless access point, wherein information received from the wireless access point comprises at least one of suspicious web service access or running distributed denial-of-service attacks by the one or more second wireless devices connected to the access point;
      3) selecting a second security policy to apply to the first wireless device based on the information received from the wireless access point;
      4) adjusting the one or more communication parameters of the first wireless device based on the second security policy; and
      5) communicating with the wireless access point using the adjusted one or more communication parameters.

13. The apparatus of claim 12, wherein each of the first security policy and the second security policy includes a set of one or more communication parameters and associated values that define if and how data should be sent via the wireless access point.

* * * * *